Dec. 16, 1969   G. RINALDO   3,484,671
CIRCUIT ARRANGEMENT FOR CONTROLLING THE MOTORS OF
AT LEAST TWO ON-LOAD VOLTAGE CHANGERS
Filed April 5, 1966   5 Sheets-Sheet 3

INVENTOR
GIUSEPPE RINALDO
BY Steinberg + Blake
ATTORNEYS

Dec. 16, 1969  G. RINALDO  3,484,671
CIRCUIT ARRANGEMENT FOR CONTROLLING THE MOTORS OF
AT LEAST TWO ON-LOAD VOLTAGE CHANGERS
Filed April 5, 1966  5 Sheets-Sheet 4

INVENTOR
GIUSEPPE RINALDO
BY *Steinberg & Blake*
ATTORNEYS

Dec. 16, 1969    G. RINALDO    3,484,671
CIRCUIT ARRANGEMENT FOR CONTROLLING THE MOTORS OF
AT LEAST TWO ON-LOAD VOLTAGE CHANGERS
Filed April 5, 1966    5 Sheets-Sheet 5

INVENTOR
GIUSEPPE RINALDO
BY *Steinberg + Blake*
ATTORNEYS

United States Patent Office 3,484,671
Patented Dec. 16, 1969

3,484,671
CIRCUIT ARRANGEMENT FOR CONTROLLING THE MOTORS OF AT LEAST TWO ON-LOAD VOLTAGE CHANGERS
Giuseppe Rinaldo, Via Milan, San Mauro Torinese, Torino, Italy
Filed Apr. 5, 1966, Ser. No. 540,268
Claims priority, application Italy, July 15, 1964, 15,838/64; Nov. 3, 1964, 24,049/64
Int. Cl. H02p 1/56
U.S. Cl. 318—226         3 Claims

ABSTRACT OF THE DISCLOSURE

A control circuit connects a plurality of electric motors into a power network and comprises a plurality of switching each of the motors into the power network. Selected windings of every one of the motors are connected into the power network via a corresponding one of the switches. Connectors connect corresponding ones of the selected windings of each of the motors to each other with each of the windings in series circuit arrangement with the corresponding switch.

DESCRIPTION OF THE INVENTION

This invention concerns a circuit arrangement for controlling the starting and stopping of two or more electric motors. The motors are preferably, but need not necessarily be, of three-phase type. The motors are provided with contactor devices such as, for example, remote-control switches, remote-control reversing switches and the like, for connection with the power network. The switches form part of known on-load voltage changers used with parallel-connected transformers. More particularly, the invention relates to a circuit arrangement including the stator windings of electric motors of on-load voltage changers of parallel-connected transformers. The voltage changers are automatically operated under the control of voltage regulators of known type in order to adapt, the secondary voltage of the transformers to the demands of consumers.

The principal object of this invention is the provision of a circuit arrangement which is adapted to ensure the simultaneous starting of all voltage changer motors. In other words, the principal object of the invention is to provide a circuit arrangement for positively preventing the operation of the transformer ratio changers, even when the control devices such as, for example, remote control switches and the like, are in the ready for starting position, in case the closing of electric contactors by which the voltage changer motors are connected with the power network, is not made in time.

Another object of this invention is the provision of a circuit arrangement adapted to stop the operation of the voltage changers, for example, and to produce an alarm signal in case of permanent mechanical blocking of any of the contactors, providing also for opening the feeding circuit of the voltage changer motor within a predetermined period of time.

Another object of the invention consist in the provision of a circuit arrangement for stopping operation and for producing an alarm signal in the following cases:

(a) Doubtful or permanent interruption of the auxiliary circuit of the voltage changer control device. This involves poor contact due to loose feed terminals, poorly designed or out-of-adjustment cams, worn-out or burnt contacts, foreign matter, or dirt trapped between the contacts, or poor operation of an electromagnetic remote control switch due to an open circuit in its winding or an insufficient attraction as a result of short-circuiting of two or more winding turns.

(b) Insufficient or improper braking of a voltage changer.

(c) Mechanical locking of a voltage changer control device due to blocking or a jammed brake.

(d) Switching delay of remote control switches of the motors, due to residual magnetism or to slackened springs.

(e) Tripping of a protective thermal relay included in the voltage changer.

Still another object of the invention is the provision of a circuit arrangement for insuring positive protection against all dangers which may be caused by improper operation of the voltage changer such as, for example, an insufficient or too weak control signal inadequate for causing an on-load start of the voltage changer; a prolonged or permanent closing of the contacts of voltage changers due to mechanical blocking.

According to the invention, the windings of all voltage changer motors are electrically connected with one another, whereby the contactors such as, for example, remote control switches, remote control reversing switches and the like, are series-connected with one another. As a consequence thereof, the motors can be started only when the contactors are simultaneously closed.

In the particular case of two parallel connected transformers, each having an on-load voltage changer comprising a three-phase motor, each phase winding of one of the motors is series or parallel-connected with a different phase winding of the other motor. Each of the resulting three phase winding pairs is connected across two different conductors of the three-phase power supply lines by at least two contactors which are series-connected with each other and with the considered pair of phase windings. Each of the contactors corresponds to a different motor. As a consequence of the arrangement, the two motors can be started only when all the contactors are closed.

The invention will be better appreciated from a consideration of the following detailed description of a few particular embodiment forms thereof, as shown in the accompanying drawings, both description and drawings being non-restrictive examples.

Figure 1:
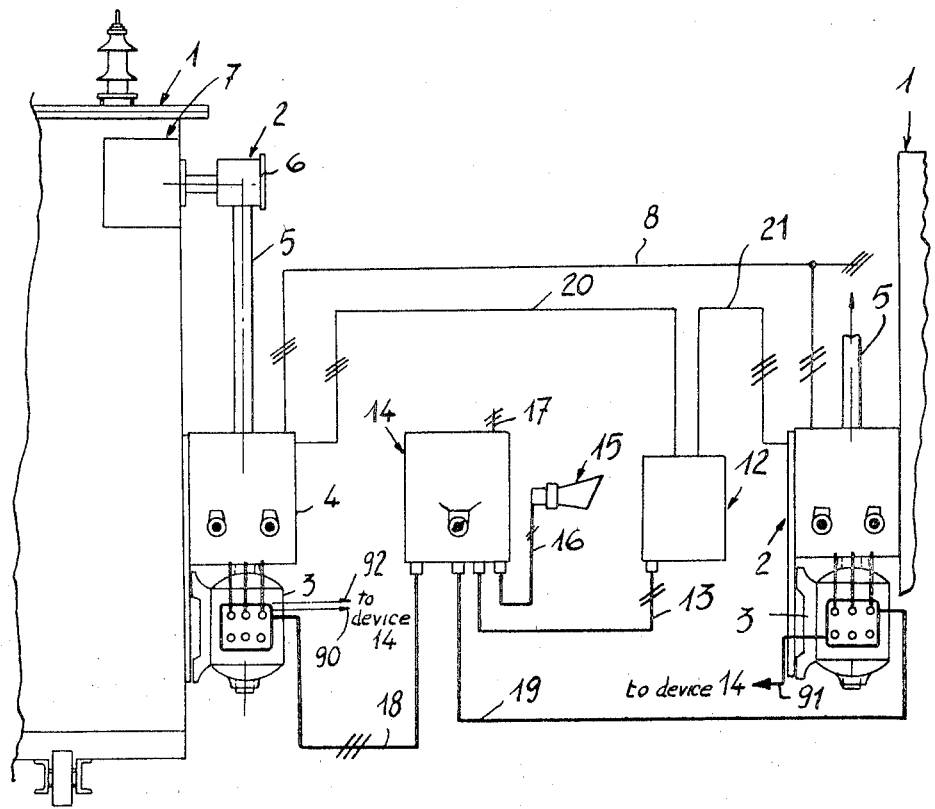
FIG. 1 is a diagrammatic partial view of two transformers having on-load voltage changers and a block diagram of the voltage regulator for controlling the voltage changers and the arrangement of the invention.
Figure 2:
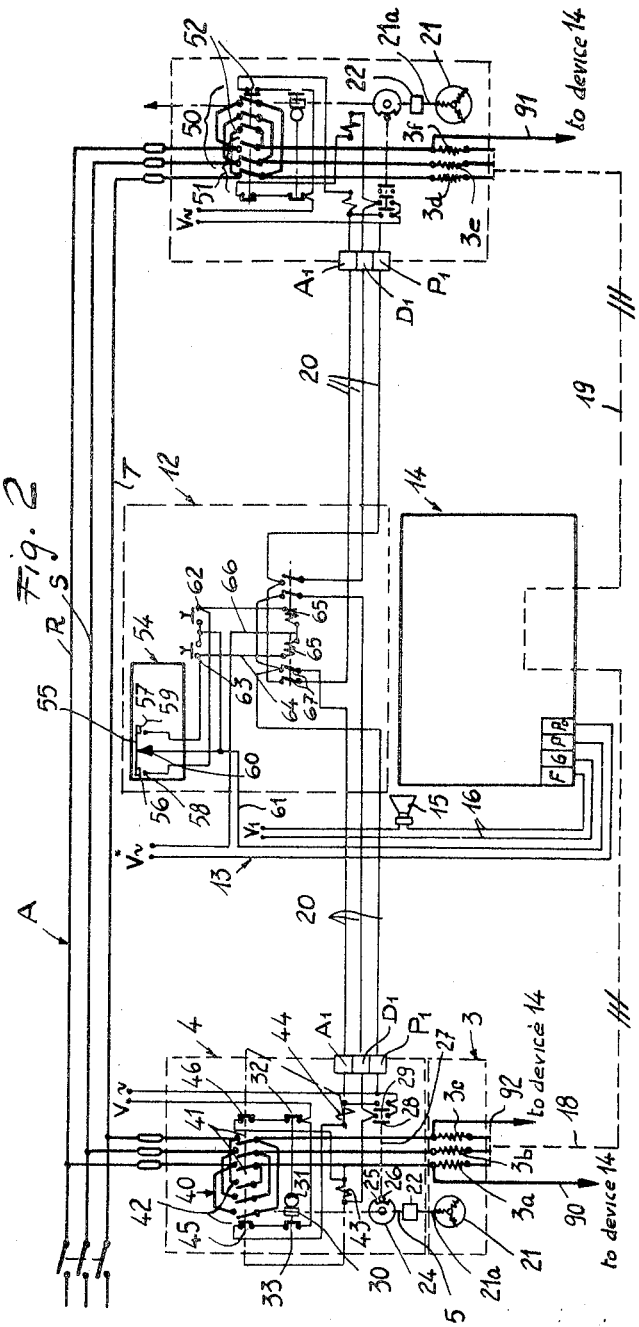
FIG. 2 is a circuit diagram of the voltage changers of FIG. 1, including the mechanical components.
Figure 3:
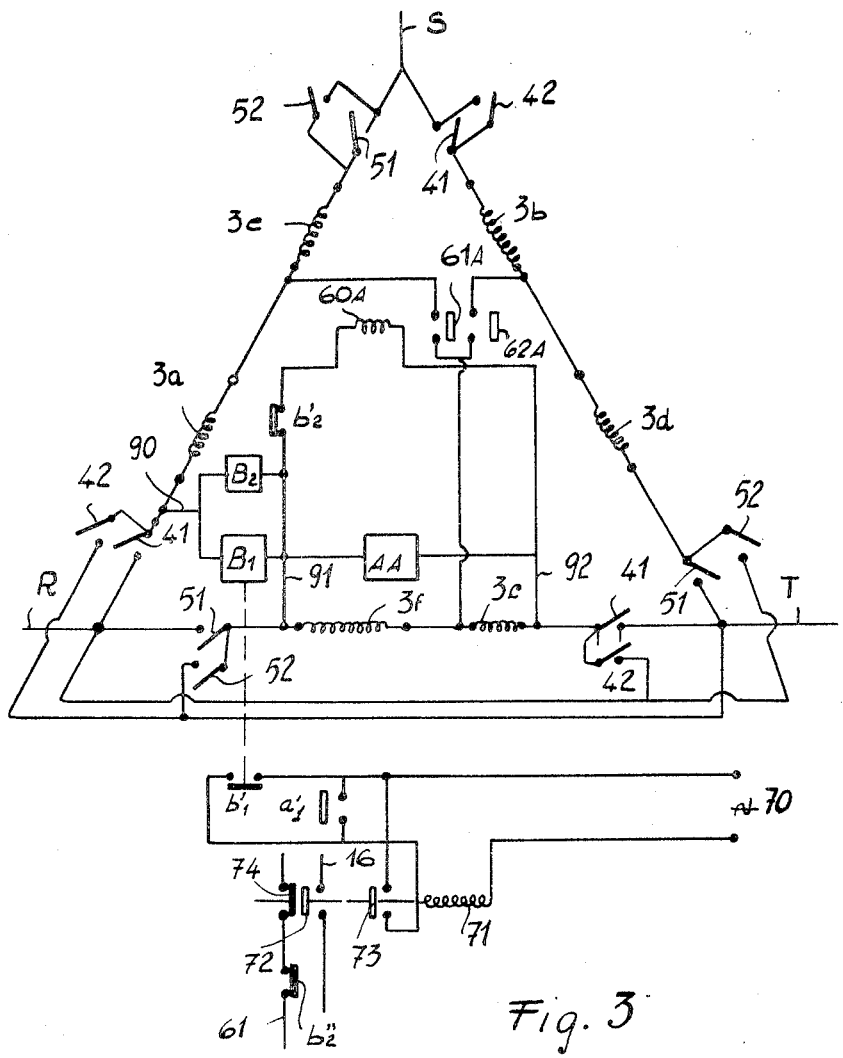
FIG. 3 is a circuit diagram of the circuit arrangement of the invention including the windings of both electric motors of the voltage changers of FIGS. 1 and 2.

In FIGS. 1 to 3, the circuit arrangement of the invention is shown as utilized with two on-load voltage changers each corresponding to a transformer. Two transformers are connected in parallel with a network (not shown in the figures) are indicated by the reference numeral 1. In order to control the secondary voltage of both transformers, each of them is provided, in a well known manner, with an on-load voltage changer, of known type and indicated by the reference numeral 2. Each on-load voltage changer comprises, in a known manner, a three-phase motor 3, and a unit 4. The unit 4 comprises reduction gears, cams by which the contactors of the circuit of the voltage changer are operated, and additional known devices which are hereinafter described. A shaft 5 at the outlet of the unit 4 is driven by the motor 3 and drives a known device 7 via a gear transmission. Turns of the secondary winding of the transformer are included in or excluded from the circuit by a slider, thereby increasing or decreasing the output voltage of the transformer to the required value.

The on-load voltage changer is a known device which functions to move a slidable or movable contact along a plurality of tap points or contacts in different positions on the secondary winding of the transformer under the control of the regulator. The shaft 5 of the motor 3 (FIGS. 1 and 2) operates a cam 24 via a reduction gear 22 (FIG. 2) and operates a limit cam 31 via a worm gear 30 (FIG. 2). The shaft 5 rotates a threaded member, to which the slidable contact is coupled, via a transmission 6 (FIG. 1). The movable slidable contact is therefore moved along the tap points of the secondary winding of the transformer in a direction dependent upon the direction of rotation of the threaded contact, and, therefore upon the direction of rotation of the motor 3.

The electric motors 3 are supplied from a three-phase power network A and, the remote control switches or remote control reversing switches of said motors are controlled by a well known voltage regulator 12. The voltage regulator may, for example, comprise a yoke or lever 55 having its fulcrum 60 connected to a network V. Both ends 56 and 57 of the lever 55 are adapted to alternately engage fixed contacts 58 and 59, thereby causing the closing of two different circuits, one of which causes an increase in the output voltage of the transformers and the other of which causes a decrease in said output voltage.

The voltage regulator 12 is electrically connected via conductive lines to a circuit arrangement 14. In the circuit arrangement 14, the connections between the windings 3 of the two motors are established in accordance with the present invention. The arrangement 14 includes timers, hereinafter described, by which the operation of the motors 3 is controlled. The timers also control the voltage regulator 12, as well as an alarm device 15 which is connected to the circuit arrangement 14 through the conductive lines 16.

The alarm device 15 is illustrated as an alarm siren although it can be associated with or replaced by any other suitable acoustic and/or visual alarm device or devices.

The circuit arrangement 14 is connected to a single-phase power supply network, or source by conductive lines 17, and is also connected to the two motors 3 via the three-phase conductive lines 18 and 19.

In FIG. 2 the same reference characters of FIG. 1 are used to indicate equal or similar components. In FIG. 2, $3a$, $3b$, $3c$ are the stator winding of one of the motors 3 and, $3d$, $3e$, $3f$ are the stator windings of the other motor 3. The motors 3 have rotors 21. A reduction gear 22 is driven by the shaft $21a$ of each motor. The output 5 of the reduction gear 22 drives a cam 24 having a notch 25 on its periphery. As is well known, a complete revolution of the cam results in a shifting of the slider of the device 7 from one contact to the next, or to the next-preceding contact, such contacts being connected to the turns of the secondary winding of the transformer. A cam follower 26 is urged by lastic means (not shown in the figures) against the periphery of the cam. The cam follower is coupled to a pair of contacts 28 and 29 via a rod 27. The remote control switch or remote control reversing switch 40 are deenergized by the contacts 28 and 29 to open the motor feed circuit. A worm gear 30 is driven by the shaft 5 and drives a cam 31 via a suitable gear. A complete revolution is performed by the cam 31 when the upper or lower end-stroke position is reached by the slider of the device 7 by which the turns of the secondary winding of the transformer are included in or excluded from the circuit. The contacts 32 and 33, which are controlled by the cam 31, prevent the motor 3 from running in a given direction when either of the end stroke positions have been reached by the slider of device 7.

The motor windings $3a$, $b$, $c$ are connected to the three-phase power network A via conductive leads R, S, T through the remote control reversing switch 40. The coils 43 and 44 of the switch 40 are alternately energized to cause the closing of contact groups 41 and 42 of the remote control reversing switch 40 and therefore the rotation of motor 3 in a given direction or in the opposite direction. Rotation of the motor in one direction drives the slider of the device 7 in a manner which increases the output voltage of the transformer. The opposite occurs when the motor rotates in the opposite direction. The group of the three contacts 42 is mechanically coupled to a contact 45 and the group of three contacts 41 is coupled to a contact 46.

The operation of the on-load voltage changer will now be briefly described for the case in which a voltage is applied by the voltage regulator 12 through conductive lines 20 to the terminals $A_1$ and $P_1$ of the device 4. This occurs when the voltage of the secondary winding of transformers 1 is to be increased. In this case, a circuit is closed through the contacts 33 and 45 of the power supply network V, whereby the relay 44 is energized. The contact 46 is thus opened and the contact group 41 is closed, and the motor is therefore energized. The contacts 28, 20 are therefore closed by the cam 25, whereby the relay 44 is kept energized even when no voltage is aplied to terminals $A_1$ and $P_1$. In fact, in this case the circuit to the network V is closed through the contact 29, the relay 44 and the contacts 45 and 33.

Since the operation of the voltage changer is well known, the foregoing description is sufficient to explain how, by the application of a signal to leads D1 and P1, the voltage changer operates in a fully similar manner, however in the direction of a decrease in the output voltage. In fact, in such case, the contact group 42 is closed and the motor 3 is thereby caused to reverse its running direction.

Since the arrangement of the on-load voltage changer corresponding to the second transformer is fully similar to the aforedescribed voltage changer, further explanation is unnecessary. Thus, the same reference characters have been utilized to indicate similar components, except that the remote control switch is indicated by numeral 50, while the two groups of three contacts are respectively indicated by numerals 51 and 52, for greater clarity in the following disclosure.

As previously stated, the voltage regulator, which is well known, is indicated in its entirety by reference numeral 12. The reversing switches 41, 42 and 51, 52 function to connect the motor 3 to the power supply network and to control the direction of rotation of the motor in accordance with the control provided by the voltage regulator 12. The voltage regulator 12 senses a voltage differential, which may be positive or negative, and applies a signal either to the terminals $A_1$, $P_1$, or $A_1$, $D_1$. As a result, either of the coils 43 or 44 of the reversing switch 40 are energized. The coil 44 controls the contacts 41 and 46 and the coil 43 controls the contacts 42 and 45, as shown in FIG. 2.

More specifically, the voltage regulator 12 comprises a known member 54, which compares the voltage of the network supplied by the transformer with a reference voltage. When there is a voltage differential, the comparison results in a swinging motion of the yoke 55 in either direction. Swinging of the yoke 55 brings the contacts 56 and 57, at the ends of said yoke. into contact with the fixed contacts 58 and 59. The fulcrum 60 of the yoke 55 is connected with the power source or network through the line 61 of the conductive lines 13.

The two fixed contacts 58 and 59 are respectively connected to the terminals 62 and 63 of two pushbuttons by manual control of both on-load voltage changers.

When the contact 57 is in electrical contact with the contact 59, a circuit is closed with the power source V+ through the terminal Po of the device 14, the device 14, the terminal P, the line 61 of the lines 13, connected to the fulcrum 60, the two contacts 57 and 59, the terminal 63, the lead 64, the relay 65 and the lead 66. The relay 65 is energized and its contacts, 67 are closed. As a result, the terminals A1 of both on-load voltage changers are connected to the terminals P1 so that the motor energizing circuits are closed, as previously indicated, and the motors 3 rotate in a direction which causes the voltage of transformer secondary windings to increase. Conversely, when the contact 58 electrically contacts the contact 56, the terminals $D_1$ and $P_1$ are connected with each other and the motors 3 are rotated in the opposite direction, that is, in a manner whereby there is a decrease in the voltage of the secondary windings of the transformers 1.

The device of the present invention, indicated by the reference numeral 14, serves to establish a proper mutual connection of the windings 3a, b, c, and 3d, e, f through the conductive loads 18 and 18, to connect and disconnect as hereinafter explained in more detail, the terminals P and Po, and, when required, to connect the terminals F and G of the device 14, to which the conductive leads 16 are connected. A voltage is applied via the leads 16 from the power source V1 to the alarm siren 15.

The circuit arrangement of the present invention is shown in detail in FIG. 3. The device 14, the windings of the motors 3 and the contacts of the remote control reversing switches 40 and 50 are also shown in FIG. 3. The conductive leads R, S and T in FIG. 3 are the three leads of the three-phase power network A. As shown in FIG. 3, the phase windings are connected in series with each other through the device 14. More particularly, the phase winding 3a of one motor is connected to the phase winding 3e of the other motor. In this manner, the voltage betwen the phase lines R-S is applied to the ends of two windings for rotation of the motor in one direction. The winding 3b is connected in series with the winding 3d. In this manner, the voltage between the phase lines S-T is applied to both ends of the windings for rotation of the motor in the one direction. The winding 3c is connected in series with the winding 3f. In this manner, the voltage between the phase lines R-T is applied to both ends of the windings for rotation of the motor in the one direction. When the motors are to be rotated in the opposite direction, the applied voltages are S-T, S-R and R-T, respectively.

The different contacts of both remote control reversing switches 40 and 50 are indicated in FIG. 3 by the same reference numerals as in FIG. 2.

As seen in FIG. 3, the six phase windings are series connected in pairs, and each pair is connected with two leads of the network via contacts corresponding to different remote control reversing switches. The contacts are therefore connected in series with each pair of phase windings. As may be readily seen, the motor can be started only when the contacts of both remote control reversing switches are closed. The device 14 comprises a number of components which are hereinafter described. In the device 14, a timer $B_2$ is electrically connected through a lead 90 to a point located between the winding 3a and the contact 41. The timer $B_2$ is also connected through a lead 91 to a point located between the contact 51 and the winding 3f. The timer $B_2$ imposes a control after a time $x$ from its energization and opens its contacts $b'_2$ and $b''_2$ for a time J. The contact $b'_2$ is connected in a conductive lead which is connected in parallel with the windings 3c and 3f. The parallel connection includes a relay 60A having contacts 61A and 62A. The contacts 61A and 62A close a circuit lead to mutually connect the intermediate points of the pairs of phase windings 3a and 3e, 3b and 3d, and 3e and 3f.

When the relay 60A is energized, therefore, the windings of each motor are connected in star arrangement with each other. Since the center of the star is represented by the contacts 61A and 62A, one of the motors may be energized even when the contacts of the remote control switch, or the remote control reversing switch of the other motor have been opened. The slower motor is thereby permitted to move the corresponding slider of device 7 from one contact to the next. The contact $b''_2$ is connected in the lead 61 (FIG. 2) and functions to prevent, after having been opened, the pulse produced by the voltage regulator 54 from reaching the relay 65 (FIG. 2).

The operation of aforedescribed arrangement is as follows.

It is assumed that a voltage has been applied to the terminals $A_1$, $P_1$ of both voltage changers by the voltage regulator 12 (FIGS. 1 and 2). That is, it is assumed that the contacts 57, 59 are temporally closed thereby causing the motors 3 of the on-load voltage changers to rotate in a direction which results in a decrease in the output voltage of the controlled transformer.

As a consequence thereof, the contacts of the remote control switches 41 and 51 are closed, and due to the particular connection of the windings of both motors, said motors can start only when both remote control switches are closed. Thus, in accordance with the invention, the two motors are interconnected with each other in a manner whereby they start at the same instant. Obviously, if one of the remote control reversing switches is not closed, due to any reason, both motors would remain deenergized, so that the on-load voltage changers would not perform as required.

If it is assumed that the contact groups 41 and 51 are both closed, both motors 3 are energized. If, for any reason, one motor has not yet operated as required, while the other motor is still in its required operation, such other motor would be permitted to complete its operation or function by the device of the present invention, that is, by the circuit controlled by the timer $B_2$. In fact, when the contacts 41 and 51 of the remote control reversing switches 40 and 50 are closed, the voltage between the phase leads R and T is applied to the relay 60A. The relay 60A is therefore energized and closes its contacts 61A and 62A. The phase windings of each motor are therefore connected in star arrangement and are made independent from each other. Thus, if one of the remote control reversing switches opens in the meantime, due to the completion of its function or operation, the motor controlled by the other remote control reversing switch remains energized and continues to rotate.

As an example only, by assuming that the contacts 51 are open and the contacts 41 are closed, the relay 60A is kept energized via the winding 3f of the stopped motor and the center of the star arrangement is kept closed via the contacts 61A and 62A. However, since the contacts 51 are open, there is a voltage differential between the terminals of the timer $B_2$. The contacts $b_2$ and $b''_2$ are therefore opened after a given time by the timer $B_2$ thereby deenergizing the relay 60A and opening the contacts 61A and 62A of the center of the star arrangement. The other motor is thus stopped. If the operation of the second motor were previously completed, the related contacts 41 are open. Both contacts $b'_2$ and $b''_2$ of the timer $B_2$ are closed after a period of time $\tau$. During the period of time $\tau$, no signal from the voltage regulator 12 is permitted to reach the voltage changers.

In accordance with the present invention, a second timer $B_1$ is connected in parallel with the timer $B_2$. The second timer $B_1$ closes its contact $b'_1$ a relatively short time such as, for example, two seconds, after its energization. Such time is materially shorter than that required by the on-load, voltage changers for completing one operation. The timer $B_1$ is energized when the contacts of one remote control reversing switch are closed and the contacts of the other switch are open. When the contacts of both remote control reversing switches have not been closed after the termination of the stated time period such as, for example, two seconds, the contact $b'_1$ is closed. A relay 71 connected in the circuit lead 70 is thereby energized and closes its contacts 72 and 73 and opens its contact 74. The contact 73 functions as a self-holding contact for relay 71 and the contact 72 connected in the lead 16 closes the circuit of the alarm device 15, thus operating the alarm. The open contact 74 connected in the lead 13 (FIG. 2) prevents the voltage regulator from operating via the lead 20, which is connected to the on-load voltage changers. As previously stated, the timer $B_1$ operates two seconds after the instant of its energization. The timer $B_1$ effects the operation when, although the contacts 51 have been closed, the contacts 41 have not been also closed, for any reason, after the expiration of said time.

A third timer AA is connected in parallel with the windings 3c and 3f, through the leads 91 and 92, in accordance with the invention. The third timer AA controls a contact $a'_1$. The contact $a'_1$ is connected in parallel with the contact $b'_1$, and functions in the same manner to energize the relay 71. When the contact $a'_1$ is closed, an alarm signal is transmitted and the contact 74 is opened and prevents the operation of the voltage regulator 12 on the on-load voltage changers. The timer AA opens its contact after it has been energized for a period of time equal to 1.5 times that required by the on-load voltage changers to complete their operation. This avoids the changers of persistent or permanent closing of the contacts through which the motor is energized. In fact, when, for example, the contacts 41 and 51 of the remote control switches are closed, the timer AA is started, and if it is still energized after a period of time equal to 1.5 times that required for one operation, it will initiate the aforedescribed operations.

Figure 4:
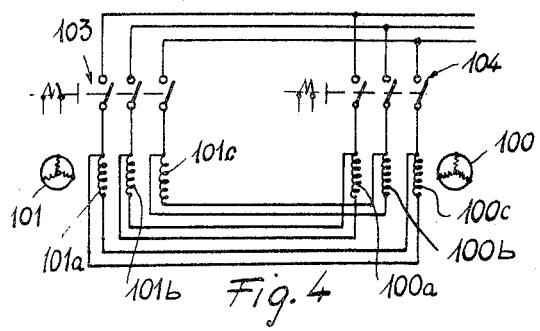
FIG. 4 is a circuit diagram of the windings of the two voltage changer motors and the corresponding remote control switches by which they are connected to the power network.
Figure 5:
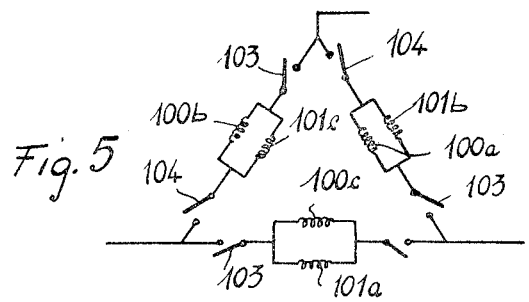
FIG. 5 is a circuit diagram of FIG. 4 in a different manner.

FIGS. 4 and 5, illustrate a circuit wherein the phase windings of both motors corresponding to on-load volttage changers are connected in parallel, instead of in series, as described with reference to the aforedescribed embodiment. To simplify both the description and drawings, it has been assumed that the two motors are connected to the three-phase network by simple remote control switches instead of remote control reversing switches.

In FIGS. 4 and 5, 101 and 100 are the rotors of the two motors of on-load voltage changers and 101a, b, c and 100a, b, c are the corresponding stator phase windings. 102 and 103 are the remote switches of the two motors and 103a, b, c and 104a, b, c are the corresponding contacts of the switches. The windings of the two motors are connected in parallel with each other, as shown in FIG. 5. More particularly, the winding 100b is connected to the winding 101c, the winding 100a is connected to the winding 101b, and the winding 101a is connected to the winding 100c. There as thus three groups, each of which consists of one winding of one motor connected in parallel with one winding of the other motor. Each group is connected in series with two contacts, one of which correspondings to the one remote control switch and the second of which corresponds to the other remote control switch. The two motors can thus start only when both remote control switches 103 and 104 are closed. Simultaneous starting of both motors is thus ensured.

Figure 6:
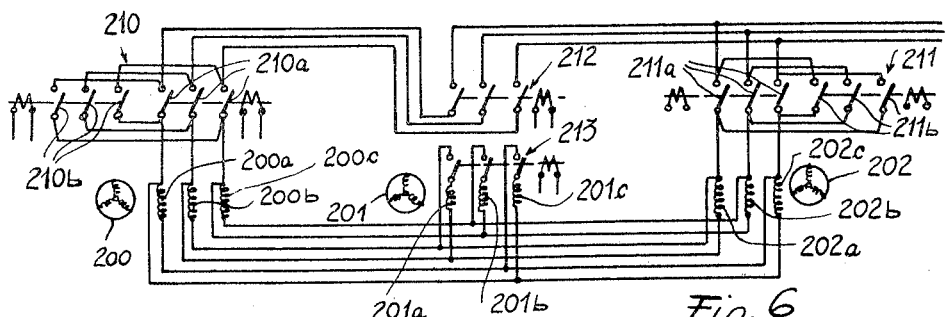
FIG. 6 is a circuit diagram of the windings of three motors and the corresponding remote control switches or remote control reversing switches, for three -on-load, voltage changers corresponding to three parallel-connected transformers.
Figure 7:
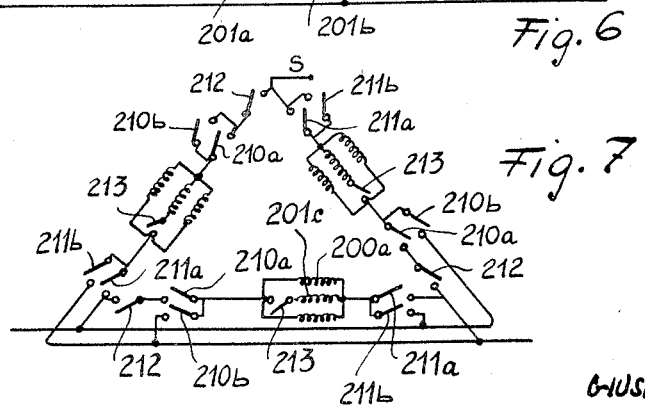
FIG. 7 is a circuit diagram of FIG. 6 in a different manner.

FIGS. 6 and 7 show by way of example only, a circuit for the simultaneous starting of three three-phase motors. The motors are connected in parallel with each other. There are three on-load voltage changers for three parallel-connected transformers. 200, 201 and 202 are the rotors of said three motors and 200a, 200b, 200c, and 201a, 201b, 201c and 202a, 202b, 202c are the corresponding three phase windings. Each of the three windings of each motor is connected in parallel with one winding of each one of the other motors. There are thus three groups, each consisting of three windings, connected in parallel with each other. The turns of parallel-connected windings are connected with the three-phase supply lines R, S and T in a manner whereby the voltage between the lines is applied to the ends of each turn. Connected in series with each turn are at least one contact of remote control reversing switch 210, at least one contact of remote control reversing switch 211, and at least one contact of remote control switch 212.

The two motors 200 and 202 are connected to the network by the remote control reversing switches 210 and 211. The motor 201 is connected to the network by the two remote control switches 212 and 213 which are operated simultaneously. The sense of rotation of the motor 201 is determined by the sense of rotation of the other motors. The contacts of the remote control switch 213 are connected in series with each one of the windings of the motor 201. The motors can only be started simultaneously, even in the latter example, since the non-closing of contacts of the remote control reversing switches 210 and 211, and of the remote control switch 212, positively prevents the supply of current to the motors.

Figure 9:
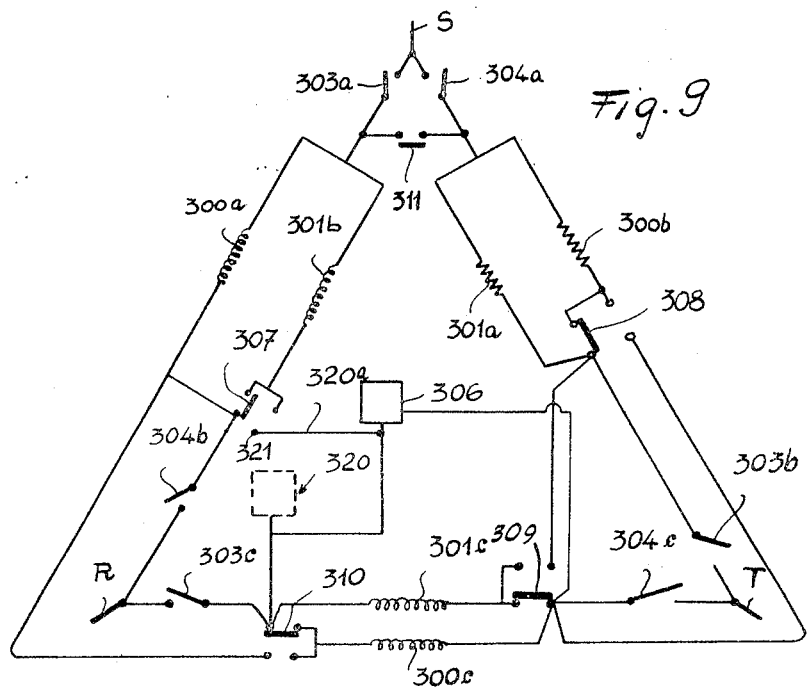
FIG. 9 is a circuit diagram of FIG. 8 in a different manner.
Figure 8:
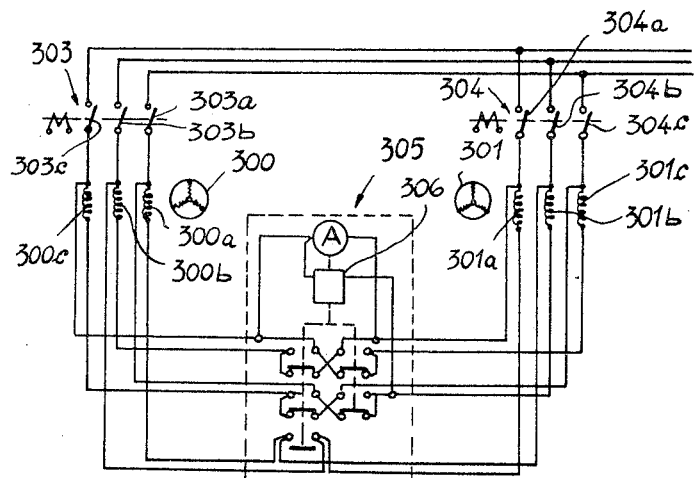
FIG. 8 is a circuit diagram similar to that of FIGS. 4 and 6 including some of the time devices of FIG. 3.

FIGS. 8 and 9 is a modification similar to the embodiment of FIGS. 4 and 5. In the embodiment of FIGS. 8 and 9 each stator phase winding of one of the three-phase motors, is connected in parallel- with one winding of the other motor. As is more clearly emphasized hereinafter, to make the windings of both motors independent of each other in order to permit the slower motor to complete its operation, provision is made for connecting the windings of each motor in delta arrangement with each other after the remote control switches, in place of which, remote control reversing switches may be utilized, have been closed. The two delta-arrangements are separately energized. The connections then permit, with the assistance of a timer, the continued energization of the slower motor even after the remote control switch of the faster motor is opened at the completion of its operation.

In the embodiment of FIGS. 8 and 9, form it is assumed, for simplicity's sake, that both electric motors, consisting of rotors 300 and 301 and stator windings 300a, b, c and 301a, b, c are energized from the three-phase network RST, respectively via the remote control switches 303 and 304, instead of remote control reversing switches. This permits the simplification of the drawings. However, the invention is not restricted to the use of a remote control switch only, since a remote control reversing switch can be readily substituted for a remote control switch by anyone skilled in the art.

More particularly, it can be seen that by means of the device 305 of the present invention, which is similar to the device 14 of the embodiment of FIGS. 1, 2 and 3, the stator windings of both motors are connected in parallel, phase by phase, to each other, when the timer 306 is deenergized.

The timer 306 has a plurality of contacts 307, 308, 309, 310 and 311. When the timer 306 is deenergized, its contact 307 is connected in series with the winding 301b, so that the winding 301b is connected, through the contact 304b of the remote control switch 304, to the phase line R of the three-phase supply lines. The winding 301b is connected in parallel with the winding 300a, through the contact 307. The parallel connection 301b, 304b and 300a is connected to the phase line S of the supply lines, through a contact 303a of the remote control switch 303. The windings 301c and 300c are connected in parallel with each other, when the timer 306 is inoperative, through the contacts 309 and 310, and are also connected to the phase lines R and T by the contacts 304c and 303c of the remote control switches. The two remaining windings 300b and 301a of both motors are also connected in parallel with the phase lines S and T through the contact 308 of the timer 306 and the contacts 304a and 303b of the remote control switches.

It is obvious from the foregoing that both motors can be started only after both remote control switches 304 and 303 have been closed.

The closing of the remote control switches energizes the timer 306 and thus changes the condition of the corresponding contacts 307, 308, 309, 310 and 311. The timer 306 is connected to a point of the circuit arrangement which is located between the contact 304c and the parallel-connection of windings 301c and 300c. The timer 306 is connected to a point intermediate the parallel connection of windings 300c and 301c, and the contact 303c of the remote control switch 303. The timer 306 is also connected through the lead 320a to a terminal 321 which is connected to the winding 301b via the contact 307. It is thus apparent that the remote control switch is supplied by the voltage between the phase lines S and R of the three-phase supply lines. The contacts of the timer 306 are kept in their new conditions for a time equal for example, to $t+2$ seconds, where $t$ is the period of time required by the faster motor to complete its operation. After the expiration of such time period, the contacts are returned to their condition shown in FIG. 9.

Due to the changing of the condition of the contacts, the windings of each motor are connected in delta-arrangement with the power supply network, with the motors independent from each other. The slower motor is thus not stopped by the opening of the remote control switch of the faster motor. The slower motor is stopped upon the expiration of the period of time set by the timer 306. The contacts of the timer 306 are then returned to their condition, shown in FIG. 9. When the operation of the motor and the corresponding auxiliary devices is proper, the timer 306 stops after the remote control switch of the slower motor is opened.

Although not shown in the drawings, the timer 306 controls a contact which bridges the voltage regulator (54 in FIG. 2, and contact $b''_2$ in FIG. 3). The arrangement is similar to that hereinbefore described with reference to the other embodiments.

In FIG. 9, a timer 320 functions in a manner similar to that of the timer $B_2$ of the embodiment of FIGS. 1, 2 and 3. The timer 320 controls a circuit similar to that shown in the lower part of FIG. 3. The timer 320 is connected between the contact 304b of the remote control switch of the motor 301 and the junction point of the timer 306.

The timer AA of the first embodiment (FIG. 3) is not shown in FIG. 9 in order to maintain the clarity of illustration. Any one skilled in the art may position the timer AA with facility.

While the invention has been described in detail with respect to specific, presently preferred examples and embodiments thereof, it will be understood by those skilled in the art, after understanding the invention, that various changes and modifications may be made therein without departing from the spirit and scope of same invention, and it is therefore intended to cover all such changes and modifications in the appended claims.

What I claim is:

1. A control circuit for simultaneously connecting a plurality of electric motors into a power network, each of said plurality of motors having a plurality of windings, said control circuit comprising a plurality of switching means for switching each of said motors into said power network, selected windings of every one of said motors being connected into said power network via a corresponding one of said switching means, connecting means connecting corresponding one of the selected windings of each of said motors to each other with each of said windings in series circuit arrangement with the corresponding switching means, each of said plurality of motors being a three phase motor having first, second and third phase stator windings and said connecting means connecting the first stator windings of each of said motors to each other with each of said first stator windings in series circuit arrangement with the corresponding switching means, connecting the second stator windings of each of said motors to each other with each of said second stator windings in series circuit arrangement with the corresponding switching means, connecting the third stator windings of each of said motors to each other with each of said third stator windings in series circuit arrangement with the corresponding switching means, and interconnecting the first, second and third phase winding connections in delta configuration with said power network, said power network including voltage changer means, and additional switch means for connecting said voltage changer means in said control circuit and timer means for controlling said additional switch means to operate in a determined condition for a determined period of time.

2. A control circuit as claimed in claim 1, including alarm signal means, alarm switch means for energizing said alarm signal means to provide an alarm signal and for deenergizing said alarm signal means and said timer means being a time circuit means for controlling said additional switch means and said alarm switch means to energize said alarm signal means and for disconnecting said voltage changer means from said control circuit at a determined period of time after operation of the switching means of a motor to connect motor into said power network.

3. A control circuit as claimed in claim 1, including an alarm signal means, alarm switch means for energizing said alarm signal means to provide an alarm signal and for deenergizing said alarm signal means and said timer means controlling said additional switch means, said plurality of switching means and said alarm switch means to energize said alarm signal means, for disconnecting said voltage changer means from said control circuit and for opening said plurality of switching means at a predetermined period of time from the failure of a switching means to disconnect the corresponding motor from said power network upon failure of a switching means to so open.

References Cited

UNITED STATES PATENTS

| | | | |
|---|---|---|---|
| 2,182,646 | 12/1939 | Shutt | 318—226 |
| 2,377,726 | 6/1945 | Stapleton | 318—226 X |

ORIS L. RADER, Primary Examiner

A. G. COLLINS, Assistant Examiner

U.S. Cl. X.R.

318—83, 111